United States Patent [19]

Bondeson et al.

[11] Patent Number: 5,650,083
[45] Date of Patent: Jul. 22, 1997

[54] THERMOPLASTIC MATERIAL MELTING APPARATUS

[75] Inventors: Benjamin J. Bondeson, Buford; Gregory J. Gabryszewski, Lithonia, both of Ga.

[73] Assignee: Nordson Corporation, Westlake, Ohio

[21] Appl. No.: 539,172

[22] Filed: Oct. 4, 1995

[51] Int. Cl.$^6$ .................................................. F27B 14/00
[52] U.S. Cl. ........................ 219/421; 219/424; 222/146.5
[58] Field of Search .................................... 219/385, 388, 219/391, 392, 393, 395, 399, 402, 406, 407, 408, 409, 410, 412, 420, 421, 422, 424; 222/146.5, 56

[56] References Cited

U.S. PATENT DOCUMENTS

| | | |
|---|---|---|
| 2,544,661 | 3/1951 | Fossa . |
| 3,352,279 | 11/1967 | Lockwood . |
| 3,377,466 | 4/1968 | Paulsen . |
| 3,531,023 | 9/1970 | Mercer . |
| 3,876,105 | 4/1975 | Kelling . |
| 3,952,921 | 4/1976 | Tanner . |
| 4,024,854 | 5/1977 | Park et al. . |
| 4,308,447 | 12/1981 | Nötzold et al. . |
| 4,485,942 | 12/1984 | Petrecca ............................... 222/146.5 |
| 4,505,669 | 3/1985 | Rogers . |
| 4,667,850 | 5/1987 | Scholl et al. . |
| 4,724,983 | 2/1988 | Claassen . |
| 4,811,863 | 3/1989 | Claassen . |
| 4,821,922 | 4/1989 | Miller et al. . |
| 4,848,420 | 7/1989 | Claassen . |
| 4,850,425 | 7/1989 | Anderson . |
| 4,898,527 | 2/1990 | Claassen . |
| 4,919,308 | 4/1990 | Majkrzak . |

FOREIGN PATENT DOCUMENTS

| | | |
|---|---|---|
| 953733 | 4/1964 | United Kingdom . |
| 2296965 | 7/1996 | United Kingdom . |
| WO8905278 | 6/1989 | WIPO . |

OTHER PUBLICATIONS

Sta-Warm Brochure, "Coated Fabric", Sta-Warm Electric Company, Inc., North Chestnut Street, Ravenna, Ohio 44266, PB #7.

Sta-Warm Brochure, "Glue melting Equipment", Sta-Warm Electric Company, Inc., North Chestnut St., Ravenna, Ohio 44266, G-8.

Sta-Warm Brochure, "Aid Plastic Coated Pipe Production", Sta-Warm Electric Company, Inc., North Chestnut St., Ravenna, Ohio 44266, Republic Steel Inst.

Sta-Warm Brochure, "Aid Plastic Coated Pipe Production", Sta-Warm Electric Company, Inc., North Chestnut St., Ravenna, Ohio 44266, Hill-Hubbell Inst.

Drawing, "Hot Melt Adhesive Tank", Sta-Warm Electric Company, Inc., North Chestnut Street, Ravenna, Ohio 44266.

(List continued on next page.)

*Primary Examiner*—Tu B. Hoang
*Attorney, Agent, or Firm*—Wood, Herron & Evans, LLP

[57] ABSTRACT

A hopper-type dispensing unit for receiving and melting a slug of thermoplastic material, such as hot melt adhesive. In a first embodiment a plurality of container supports formed of a material, such as steel, having a low heat conductivity extend inwardly from inner walls of the unit and radially inward of the opening in the inverted container to obstruct the path of the adhesive slug and cause a smooth, controlled descent. The steel supports are vertical members which extend upwardly from a melting grid of the unit to a point which allows a significant portion of the adhesive slug to remain in the apparatus when the container is empty. A plurality of heating fins are also provided about the inner periphery of the hopper and are generally disposed between the steel supports in the first embodiment. In a second embodiment the container supports are eliminated and the container is supported in another manner, leaving the fins as both slug descent control elements and supplemental heating elements.

17 Claims, 2 Drawing Sheets

OTHER PUBLICATIONS

Drawing, Sta–Warm AD 32 55 Compound Melter #34C21570, Jan., 1964.

Drawing, Sta–Warm DWIOS Drum Warmer #34B27840 2/2. Oct. 1069.

Brochure, "Hot–Melt Processors", May Coating Technologies, Inc., 2280 Terminal Road, St. Paul, MN 55113.

Brochure, "200/400 Series Hot–Melt Drum Unloaders", May Coating Technologies, Inc., 2280 Terminal Road, St. Paul, MN 55113.

THERMOPLASTIC MATERIAL MELTING APPARATUS

BACKGROUND OF THE INVENTION

This invention generally relates to thermoplastic material melting and dispensing technology and, more specifically, to devices for melting and dispensing so-called hot melt adhesive materials.

Thermoplastic adhesive materials which are heated and liquified just prior to their application on a substrate are referred to as "hot melt" adhesives. Hot melt adhesives are available in bulk in such forms as chicklets, pellets, slats and bricks, and are also available in the form of a slug contained in a pail or drum. A drum of bulk adhesive material may be as large as a conventional 55 gallon drum for large scale applications. The present invention is directed at solving various problems encountered with melting adhesive which is initially contained as a slug in such a pail or drum.

Typically, hopper-type dispensers have been used to both remove the slug of adhesive from the drum or container and to melt the slug of adhesive as it contacts a heated melting grid at the bottom of the hopper. A heated reservoir is disposed beneath the melting grid and receives the melted or liquified hot melt adhesive as it passes through the grid. The reservoir maintains the adhesive in a heated liquid state suitable for the application. An outlet of the reservoir typically leads to a pump for pumping the hot melt adhesive to a dispensing apparatus, appropriate for the application.

The melting grid of hopper-type dispenser units must be of sufficient strength to receive the heavy load of a slug of adhesive from a 55 gallon drum. Such slugs of adhesive may weigh up to several hundred pounds. On the other hand, the grid must be formed with intersecting grid members narrow enough to provide openings therebetween which allow a high throughput volume of liquified hot melt adhesive. If the grid members are made too narrow, however, the weight of the slug of adhesive will cause them to crack, bend or break and reduce the life of the grid. Therefore, a trade-off has existed between providing high throughput volume of liquified hot melt adhesive and providing a strong, sturdy melting grid with a long useful life.

Another characteristic of hopper-type dispensing units in need of attention and improvement relates to the difficulties encountered when replacing one drum with a new drum of adhesive after the adhesive slug in the first drum has moved downwardly into the hopper. This changeover procedure must occur rapidly enough that the hopper reservoir does not become depleted of adhesive before the next slug of adhesive is in place and being melted by the melting grid. Presently, the adhesive which is left in the hopper unit when the first drum is removed and a second drum is being inserted may not be of sufficient volume to enable the next drum to be safely and deliberately inserted without the hopper reservoir becoming depleted of hot melt adhesive. When the reservoir empties of hot melt adhesive before the next slug is being melted by the melting grid, the adhesive residue within the hopper unit may begin to degrade, burn or char.

In view of the above, it would be desirable to provide a hopper-type dispensing unit which reduces the stress and load placed on a melting grid, provides a high throughput volume of liquified hot melt adhesive, and allows adequate time for replacing an empty drum with a new drum of adhesive without becoming depleted of adhesive during the replacement process.

SUMMARY OF THE INVENTION

In accordance with the principles of the present invention, a hopper-type thermoplastic material melting and dispensing unit is provided which receives an inverted drum containing a slug of thermoplastic material, such as hot melt adhesive, and causes a controlled and supported descent of the slug onto a melting grid disposed at the bottom of the unit. At least one slug descent control member is provided at a periphery of a thermoplastic material receiving space between a container receiving space and a melting grid of the unit. This control member obstructs the path of movement of the slug from the container to the melting grid and slows the slug down during its descent to prevent free falling of the slug.

In a first embodiment a plurality of slug descent control members are provided in the form of container supports formed of a material, such as steel, having a relatively low heat conductivity. These container supports extend inwardly from inner walls of the unit and radially inwardly of the container opening. Thus, not only do these steel supports support the full weight of the container and the slug of adhesive when the container is initially inverted and placed in the hopper unit, but they also support the slug of adhesive by obstructing its path of movement as it descends out of the container toward the melting grid. The steel supports will also provide support to the slug as it is being melted so that the melting grid does not have to support the full weight of the slug. As the steel supports have a low heat conductivity, the slug of adhesive will not be significantly melted during contact therewith, but only softened to the extent necessary to allow the slug of adhesive to pass.

The steel supports are vertical members which extend upwardly from a periphery of the melting grid to a point, preferably about nine inches above the melting grid, which leaves a significant volume of adhesive remaining in the hopper unit after the container is empty. In this way, a new container containing a slug of adhesive may be inserted into the hopper unit and the new adhesive may begin liquifying before the original adhesive slug has been fully liquified and pumped from the hopper unit.

Also in accordance with the first embodiment of the present invention, a plurality of heating fins are also provided about the inner periphery of the hopper unit and generally extending vertically between the steel supports. In a second embodiment of the invention, the steel support members are eliminated and the fins comprise slug descent control members and cause a controlled descent of the adhesive slug. In this embodiment the container is supported or suspended at the top of the hopper.

The fins are preferably thin sheet metal members formed from a material having a high heat conductivity, such as aluminum or copper. In the first embodiment the top edges of the fins are disposed at a height below the top surfaces of the steel supports such that the fins do not support any of the weight of the inverted container resting on the steel supports. The heating fins preferably extend radially inwardly a greater distance than the steel support members. As the slug of adhesive descends out of the container and past the steel support members, the heating fins extend into the adhesive slug and assist in heating and melting the adhesive, thereby increasing the throughput volume of liquified hot melt adhesive into the lower reservoir of the hopper unit. In the second embodiment the fins perform both the slug descent control function and the supplemental heating function mentioned above.

Additional advantages of the present invention will become more readily apparent to those of ordinary skill in the art upon review of the following detailed description of a preferred embodiment thereof taken in conjunction with the accompanying drawings.

DETAILED DESCRIPTION OF THE PREFERRED EMBODIMENT

Figure 1:
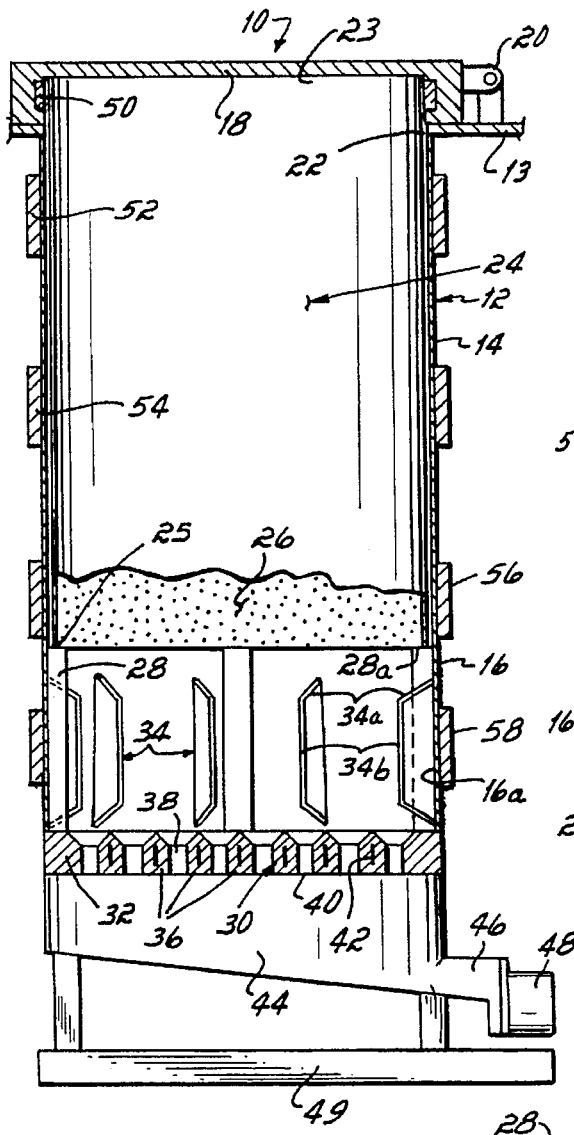
FIG. 1 is an axial cross-section of a hopper dispenser unit schematically showing a first embodiment of this invention.

Referring first to FIG. 1, a melting apparatus 10 constructed in accordance with the present invention is shown and generally includes a hopper 12 preferably disposed within a housing 13 along with other conventional components (not shown) of apparatus 10. Housing 13 is fully shown in FIG. 4 but has been cut away in FIGS. 1 and 2. Hopper 12 includes an upper container receiving portion 14 and a lower adhesive slug receiving portion 16. A lid 18 is mounted by way of a hinge 20 adjacent an open upper end 22 of hopper 12. Lid 18 receives the closed bottom end 23 of an inverted container 24 which has been inserted into upper portion 14 of hopper 12. Container 24 may, for example, be a 55 gallon drum which holds a slug 26 of hot melt adhesive in bulk form. An open end 25 of container 24 is supported on a plurality of elongated container support members 28 which extend upwardly from a melting grid 30 and radially inwardly from the lower portion 16 of hopper 12. Support members 28 are formed from a high strength material, such as carbon steel, having a low heat conductivity.

Upper surfaces 28a of each support member 28 receive a peripheral edge or rim portion of container 24 at the open end 25. As will be appreciated by a review of FIGS. 1 and 2, support members 28 extend radially inwardly past the edge or rim of container 24 such that they each provide support for adhesive slug 26 and prevent free falling of slug 26 from container 24. Peripheral supports 32 disposed about melting grid 30 receive the steel support members 28 thereon and bear the weight of the inserted container 24 and adhesive slug 26.

Figure 2:
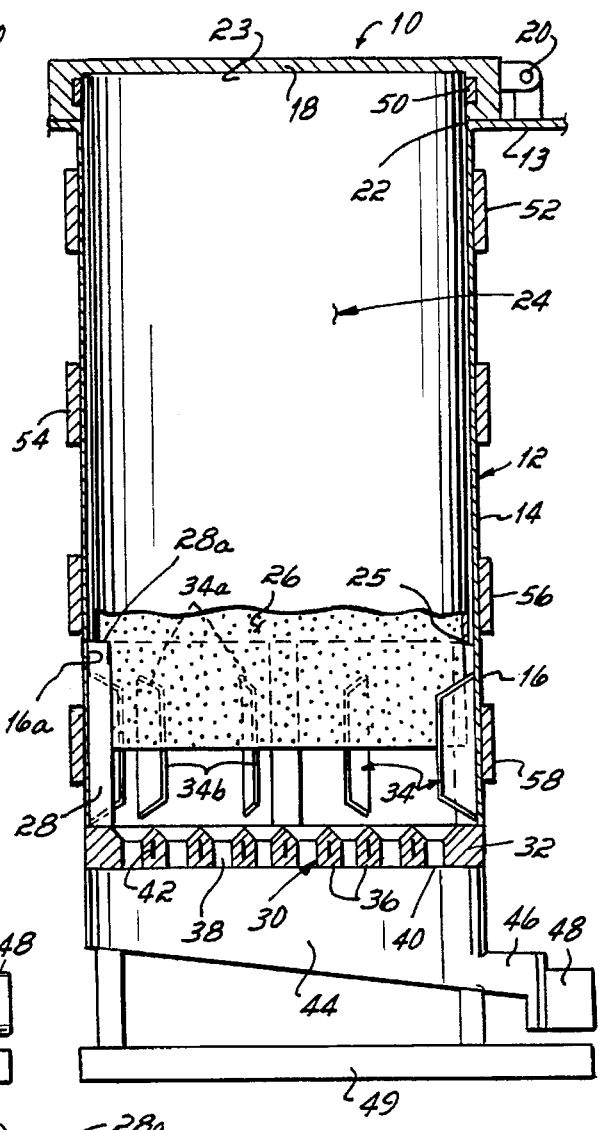
FIG. 2 is an axial cross-section of the hopper dispenser unit similar to FIG. 1 but showing a slug of hot melt adhesive descending from a container within the unit.
Figure 3:
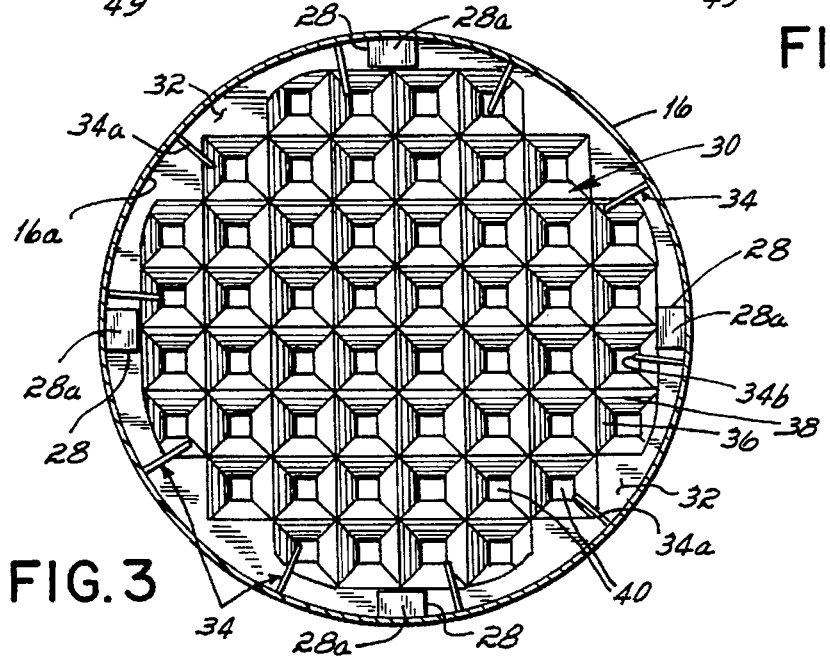
FIG. 3 is a cross-sectional view of the hopper dispenser unit taken along line 3—3 of FIG. 1.

As illustrated in FIGS. 1–3, a plurality of vertical heating fins 34, are also attached to the walls of the hopper 12 in the lower portion 16 thereof. Specifically, these heating fins 34 are rigidly connected, as by welding, to the inner wall 16a of lower hopper portion 16. Fins 34 are disposed between the various support members 28 and extend radially inwardly a greater distance than support members 28. As heating fins 34 are not designed to be load-bearing members for container 24 and adhesive slug 26 when inserted into hopper 12, their upper edges 34a are located below the upper support surfaces 28a of steel support members 28. Heating fins 34 are formed from a thin sheet material having a high heat conductivity, such as aluminum or copper, and as their inner edges 34b extend a considerable inward distance, fins 34 function to transfer heat into slug 26 as it passes over them as shown in FIG. 2.

With regard to these specific dimensions of steel support members 28 and heating fins 34, for polyurethane resin or "PUR" hot melt adhesives, which are relatively hard materials at room temperature, steel support members 28 preferably extend about one inch radially into the open end 25 of container 24. For pressure sensitive adhesives or "PSA" hot melt adhesives, which are relatively softer at room temperature, steel support members 28 preferably extend about two inches radially into the open end 25 of container 24. In each case, steel support members 28 are approximately nine inches high. The dimensions of heating fins 34 may be the same in each case or may vary depending on the type of adhesive, but preferably the radial dimension thereof is greater than the radial dimension of steel support members 28. For example, heating fins 34 may extend approximately three inches into the open end 25 of container 24 in a radial direction. There are preferably four steel support members 28 and ten heating fins 34, although these numbers may be varied.

Still referring to FIGS. 1–3, melting grid 30 comprises a plurality of intersecting heated grid members 36, 38 which define openings 40 therebetween for allowing melted or liquified hot melt adhesive material to pass through. As shown in FIGS. 1 and 2, grid members 36, 38 may each include heating elements 42 therein, although only the heating elements 42 of members 36 are shown in the drawings. A reservoir 44 is disposed beneath melting grid 30 for receiving the liquid hot melt adhesive material which passes through melting grid 30. For the purposes of maintaining this hot melt adhesive in a liquid state suitable for dispensing, conventional heating elements (not shown) may be provided within reservoir 44. Reservoir 44 includes an outlet 46 connected to a conventional pump and manifold assembly 48 which pumps the liquified hot melt adhesive to a hot melt dispensing apparatus (not shown) depending on the particular application. A base support 49 is provided beneath reservoir 44 to provide upright support for apparatus 10 in the position shown in FIGS. 1 and 2.

A plurality of band heaters 50, 52, 54, 56, shown in FIGS. 1 and 2, provide the necessary heat to allow adhesive slug 26 to slide out of container 24. Band heater 50 is contained within lid 18 and surrounds the bottom 23 of inverted container 24. Band heaters 52, 54, 56 are spaced along upper portion 14 of hopper 12 so as to be disposed adjacent the body of container 24 generally between the closed end 23 and open end 25 thereof. Band heater 58 is mounted about the lower portion 16 of hopper 12 and functions to heat this lower portion 16 as well as to heat fins 34 and, to a much lesser extent, steel support members 28 by conduction through hopper portion 16. As shown, the width of band heater 58 is preferably substantially equal to the height of fins 34.

Figure 4:
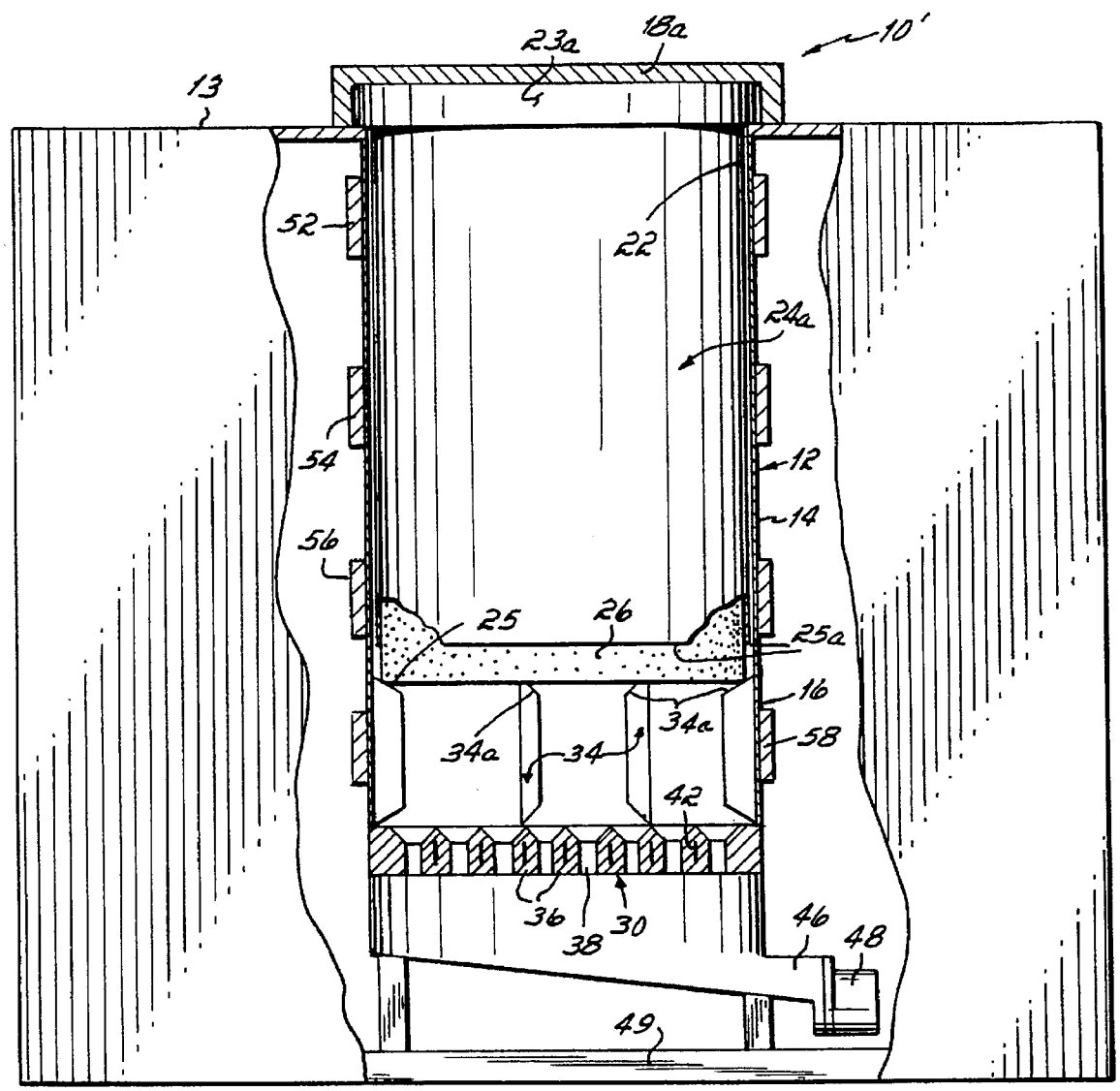
FIG. 4 is a partially fragmented view of a melting apparatus including a hopper unit constructed in accordance with a second embodiment of this invention.

FIG. 4 shows an alternative embodiment of a melting apparatus 10' constructed in accordance with the principles of the present invention. In FIG. 4, like reference numerals are used to denote like elements with respect to FIGS. 1–3. The embodiment of FIG. 4 is similar to that shown in FIGS. 1–3, however, support members 28 have been eliminated and container 24a is of a type including a flange 23a at the relative upper end when inverted into hopper 12. This flange 23a suspends container 24a within hopper 12 without having any additional support at the relative lower open end 25a. A lid 18a which may or may not include a heater (not shown), as in the first embodiment, is provided over the relative upper end of container 24a and may rest on housing 13 of apparatus 10'. Of course, other manners of suspending or otherwise supporting the container may also be used in this embodiment.

In this second embodiment, it will be appreciated that the path of movement between open end 25a of container 24a and melting grid 30 is obstructed by fins 34 which thereby prevent the freefall of adhesive slug 26 onto melting grid 30 and prevent any resulting damage to melting grid 30. As shown in FIG. 4, after band heaters 52, 54, 56 have heated container 24a sufficiently to allow adhesive slug 26 to drop from container 24a, adhesive slug 26 will initially hit the upper edges 34a of fins 34. As fins 34 are heated by band heater 58, they will melt and slice through adhesive slug 26 until slug 26 contacts melting grid 30. Then, fins 34 continue to slice through slug 26 and act as additional heaters and melters of adhesive slug 26 as described above with respect to the first embodiment of FIGS. 1–3.

Operation

Referring to FIGS. 1–3, container 24 containing a slug of adhesive 26 is inverted and inserted into upper portion 14 of hopper 12 through open end 22. Lid 18 is then closed over the bottom 23 of container 24 and band heaters 50, 52, 54, 56 are activated to conduct heat into container 24 and adhesive 26. Once slug 26 is sufficiently heated by band heaters 50, 52, 54, 56, slug 26 will begin to slide out of container 24 as shown in FIG. 2 and will pass over both steel support members 28 and heating fins 34 as it proceeds to melting grid 30. This descent will be relatively slow and controlled, i.e., adhesive slug 26 will not free-fall onto melting grid 30. Also, steel support members 28 will bear some of the weight of adhesive slug 26 and this will reduce the weight and associated stresses on melting grid 30.

Adhesive slug 26 will be melted or liquified by a combination of band heater 58 and melting grid 30. Band heater 58 will heat fins 34 which will conduct heat to more central portions of slug 26 and melting grid 30 will slice and melt the lower end of slug 26 by direct contact. Liquified hot melt adhesive will pass through openings 40 of melting grid 30 and into reservoir 44 whereupon it will be discharged through outlet 46 and pumped to a connected dispensing apparatus by pump 48. It will be appreciated that since steel support members 28 raise container 24 off of melting grid 30 by a distance of nine inches in the preferred embodiment, a nine inch high remaining mass of adhesive will be left in lower portion 16 of hopper 12 when container 24 is empty. Thus, container 24 may be lifted out of hopper 12 and replaced by a new container of adhesive before the remainder of slug 26 contained in lower portion 16 has been fully melted and pumped from reservoir 44.

The operation of apparatus 10' shown in FIG. 4 is very similar to apparatus 10 of FIGS. 1–3 with two main exceptions. First, container 24a will be supported from its relative upper end by flange 23a as opposed to being supported at its relative lower end 25a as in the first embodiment. Second, as support members 28 have been eliminated, fins 34 act to slow down the movement of adhesive slug 26 from container 24a onto melting grid 30. The remaining aspects of operation are as stated above.

Although a preferred embodiment of the present invention has been detailed above, it will be appreciated that many modifications may be made thereto without departing from the spirit and scope of the invention and, for this reason, Applicants intend to be bound only by the scope of the appended claims.

What is claimed is:

1. Apparatus for melting thermoplastic material, the apparatus comprising:

a hopper having an upper portion with an open end and a lower portion defining a receiving space for a slug of thermoplastic material;

at least one heater connected to the upper portion of said hopper;

at least one slug descent control member located at a periphery of said receiving space and extending into said receiving space; and, a melting grid mounted beneath said receiving space and spaced below an upper surface of said slug descent control member;

wherein said slug descent control member is positioned to obstruct and slow the movement of said slug from said upper portion to the melting grid in said receiving space to thereby prevent damage to said melting grid.

2. The apparatus of claim 1 further comprising a plurality of slug descent control members formed as elongate container support members disposed about the periphery of said receiving space and having upper support surfaces for receiving and supporting an inverted container of thermoplastic material.

3. The apparatus of claim 2 further comprising a plurality of fins secured about and extending inwardly from the periphery of said receiving space.

4. The apparatus of claim 3 wherein said fins each have an upper edge disposed at a height below the upper support surfaces of said container support members.

5. The apparatus of claim 4 wherein said fins extend farther into said receiving space than said container support members.

6. The apparatus of claim 3 wherein said container support members have a lower conductivity of heat than said fins.

7. The apparatus of claim 6 wherein there are more fins than container support members secured about the periphery of said receiving space.

8. The apparatus of claim 6 wherein said container support members are formed from steel.

9. The apparatus of claim 8 wherein said fins are formed from aluminum.

10. The apparatus of claim 8 wherein said fins are formed from copper.

11. The apparatus of claim 3 further comprising a band heater affixed about the lower portion of said hopper for conducting heat to said fins.

12. The apparatus of claim 1 wherein said slug descent control member are fins formed from sheet metal.

13. The apparatus of claim 12 wherein said sheet metal is aluminum.

14. The apparatus of claim 12 wherein said sheet metal is copper.

15. The apparatus of claim 1 further comprising a reservoir below said melting grid for receiving molten thermoplastic material flowing through said grid.

16. Apparatus for melting thermoplastic material, the apparatus comprising:

a cylindrical hopper having an upper portion with an open end and a lower portion defining a receiving space for a slug of thermoplastic material from said container;

a plurality of band heaters affixed about the upper portion and a band heater affixed about the lower portion of said hopper;

a lid mounted at the open end and including a heater affixed thereto;

a melting grid mounted beneath said receiving space;

a plurality of elongate container support members extending upwardly from mounting supports located at a periphery of said melting grid and having upper support surfaces spaced above said melting grid for receiving thereon an inverted container holding a slug of thermoplastic material, said container support members extending inwardly into said receiving space so as to obstruct the path of movement of the slug of thermoplastic material from said container; and, a plurality of heating fins secured about a periphery of said receiving space between said container support members and extending inwardly into said receiving space so as to obstruct the path of movement of the slug of thermoplastic material from said container, said heating fins formed from a material having a greater conductivity of heat than said container support members.

17. Apparatus for melting a slug of thermoplastic material, the apparatus comprising:

a hopper having an upper portion with an open end and a lower portion defining a receiving space for the slug of thermoplastic material;

at least one heater connected to the upper portion of said hopper;

a plurality of fins disposed about and extending inwardly from a periphery of said receiving space; and, a melting grid mounted beneath said receiving space and spaced below upper edges of said fins.

* * * * *